US008300104B2

(12) United States Patent
Lin et al.

(10) Patent No.: US 8,300,104 B2
(45) Date of Patent: Oct. 30, 2012

(54) EVENT ANNOUNCING SYSTEM AND OPERATING METHOD THEREOF

(75) Inventors: Chih-Yin Lin, Taipei (TW); Ting-Han Huang, Taichung (TW); Chia-Yuan Chang, Taichung (TW)

(73) Assignee: Quanta Computer Inc., Tao Yuan Shien (TW)

( * ) Notice: Subject to any disclaimer, the term of this patent is extended or adjusted under 35 U.S.C. 154(b) by 458 days.

(21) Appl. No.: 12/385,610

(22) Filed: Apr. 14, 2009

(65) Prior Publication Data

US 2010/0097478 A1 Apr. 22, 2010

(30) Foreign Application Priority Data

Oct. 20, 2008 (TW) .............................. 97140224 A

(51) Int. Cl.
*H04N 5/225* (2006.01)
*H04N 9/04* (2006.01)

(52) U.S. Cl. .................................................. 348/207.99

(58) Field of Classification Search .............. 348/207.99
See application file for complete search history.

(56) References Cited

U.S. PATENT DOCUMENTS 7,468,747 B2 * 12/2008 Nakamura et al. ............ 348/239
7,734,589 B1 * 6/2010 Svendsen ...................... 707/636
7,797,306 B1 * 9/2010 Pather et al. .................. 707/714
2003/0131002 A1 * 7/2003 Gennetten et al. .............. 707/10
2003/0200259 A1 * 10/2003 Tsuge ........................... 709/203
2006/0216021 A1 * 9/2006 Touchard et al. ............. 396/429
2008/0095426 A1 * 4/2008 Hasebe et al. ................ 382/138

FOREIGN PATENT DOCUMENTS

CN 2754287 1/2006
CN 101137008 3/2008

OTHER PUBLICATIONS

English Abstract of CN2754287Y.
English Abstract of CN101137008A.
Office Action in related Chinese Patent Application dated Dec. 21, 2011.

* cited by examiner

*Primary Examiner* — Anthony J Daniels
(74) *Attorney, Agent, or Firm* — Thomas, Kayden, Horstemeyer & Risley, LLP

(57) ABSTRACT

The invention discloses an event announcing system. The event announcing system comprises a portable electrical apparatus, a network, and a server. The portable electrical apparatus comprises an image capturing module, a positioning module, a time module, and a processing module. When the image capturing module captures an image information related to an event, the positioning module receives a positioning information and the time module receives a time information. The processing module is used for generating an announcing signal according to the image information, the positioning information, and the time information. When the server receives the announcing signal via the network, the server validates the announcing signal according to a validating rule and selectively generates an event report according to the announcing signal.

18 Claims, 5 Drawing Sheets

EVENT ANNOUNCING SYSTEM AND OPERATING METHOD THEREOF

BACKGROUND OF THE INVENTION

1. Field of the Invention

The present invention relates generally to an event announcing system, and more particularly, to an event announcing system and an operating method thereof for the public announcing an instantaneous event via a portable electrical apparatus (for example, a cell phone) effectively and precisely.

2. Description of the Prior Art

Recently, human's lifestyle has been gradually changed from an agrarian society to an industry society, and the pace of life has become faster. It is thus quite possible for people to witness some accidents or suffer in emergency situations.

For instance, after a typhoon passed by, there is a terrible mess on the streets. Mr. Wang wants to drive along a street but he cannot due to a big tree that fell on the street. For another instance, when Miss Chen walks home in the evening, she witnesses a terrible traffic accident. Generally, in the above-mentioned situations, Mr. Wang and Miss Chen will call the authorities and report the events to the operator to settle the accidents.

However, due to the lack of experiences, an ordinary person always can not report the information (e.g., the time and the position) related to the event clearly. In other words, in such a chaos, the person may offer incorrect information to the authorities. Additionally, it is also difficult for the person responsible for dealing with the event to judge how many persons or resources should be sent to the place only according to the oral description without any other objective information (for example, pictures or films of the event).

Accordingly, it can be found that the conventional event announcing method is ineffective and imprecise. By the conventional method, the authority may waste a lot of time and feel difficult to deal with the event. Additionally, it may also induce the loss of people's lives and property, which is really a pity.

Therefore, the invention provides an announcing event system and operation method thereof to solve the above-mentioned problems.

SUMMARY OF THE INVENTION

An aspect of the present invention is to provide an event announcing system and an operation method thereof. When a person witnesses an event, he/she can simply operate a portable electrical apparatus to offer an instantaneous event report to the authorities effectively. It is useful for the authorities to show or publish the instantaneous event report and deal with the event as soon as possible.

A first embodiment of the invention is an event announcing system. In this embodiment, the event announcing system comprises a portable electrical apparatus, a network, and a first server. The portable electrical apparatus comprises an image capturing module, a positioning module, a time module, and a processing module. When the image capturing module captures an image information related to an event, the positioning module receives a positioning information and the time module receives a time information. The processing module is used for generating an announcing signal according to the image information, the positioning information, and the time information. When the first server receives the announcing signal via the network, the first server validates the announcing signal according to a validating rule and selectively generates an event report according to the announcing signal.

In practical applications, the event announcing system further comprises a second server. When the second server receives the event report from the first server, the second server will show or publish the event report. In fact, the number of the portable electrical apparatus and that of the second server in the event announcing system have no limitations.

A second embodiment of the invention is an operating method of an event announcing system. In the embodiment, the method is used for operating an event announcing system, and the event announcing system comprises a portable electrical apparatus, a network, and a first server.

First of all, the portable electrical apparatus captures an image information related to an event. When the portable electrical apparatus captures the image information related to the event, the portable electrical apparatus receives positioning information and a time information. Next, an announcing signal is generated according to the image information, the positioning information, and the time information, and the announcing signal is transmitted to the first server. When the first server receives the announcing signal, the server validates the announcing signal according to a validating rule and selectively generates an event report according to the announcing signal by the method. In fact, the event announcing system can further comprise a second server. When the second server receives the event report from the first server, the second server will show or publish the event report.

Compared with the prior art, the event announcing system and operating method thereof fully takes advantages of satellite positioning technology and mobile communication technology. When an ordinary person witnesses or suffers from an instantaneous event (for example, an urgent event, an illegal event, or a traffic accident) he/she can operate his/her own portable cell phone to announce related information to the authorities. It is useful for the authorities to show or publish the instantaneous event report and deal with the event as soon as possible.

In addition to the above-mentioned mutual attention function, the government can analyze and compile the statistic distribution and frequency of different kinds of events for future administering reference via the event announcing system. By doing so, the event announcing system can improve the processing efficiency of the instantaneous event and lower the society cost largely, so as to build a healthier and safer environment.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

The invention provides an event announcing system and operating method thereof. When an ordinary person witnesses or suffers from an instantaneous event, he/she can operate his/her own portable electrical apparatus (e.g., a cell phone) to announce the instantaneous event report to the authorities. It is useful for the authorities to show or publish the instantaneous event report and deal with the event as soon as possible.

Figure 1:
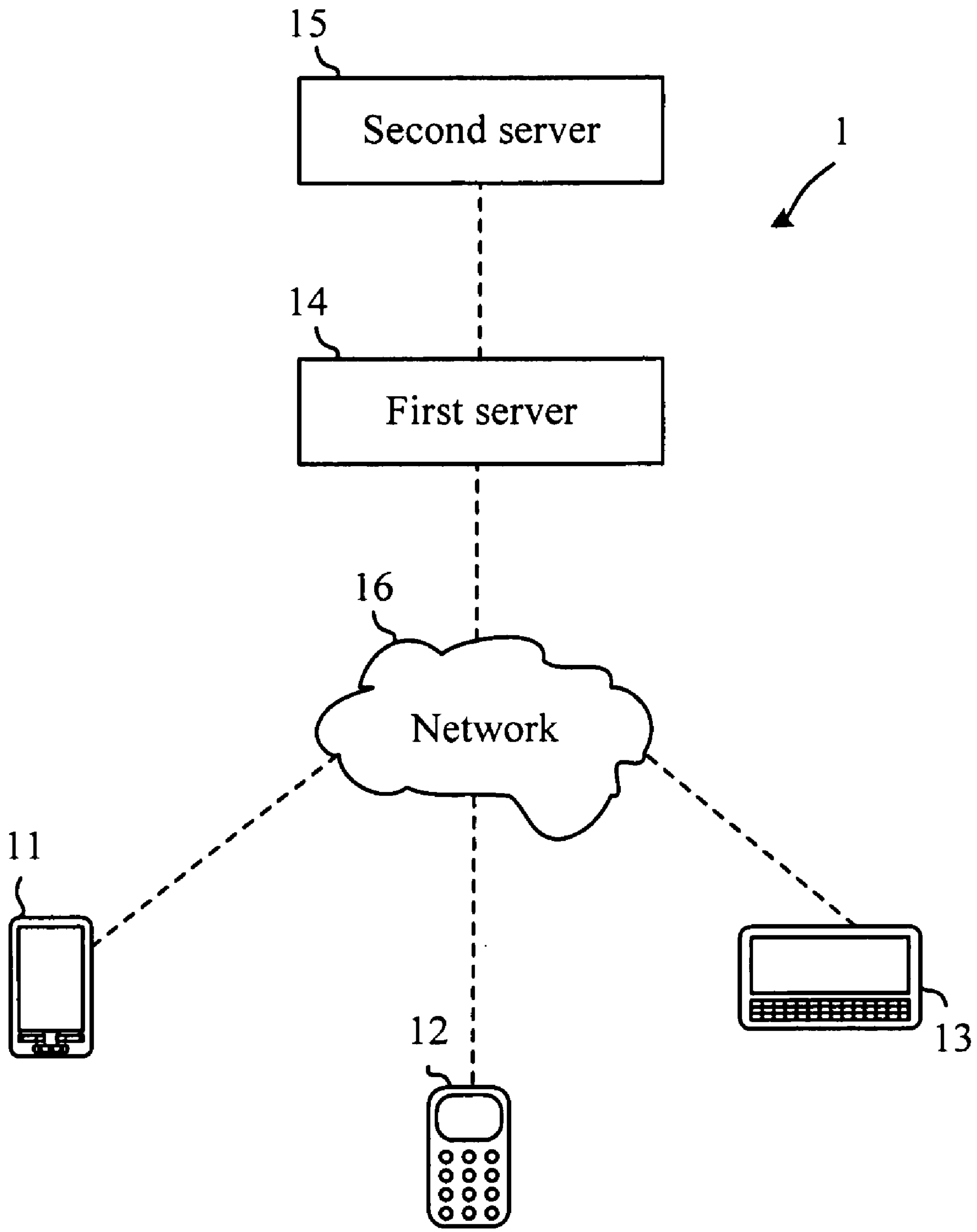
FIG. 1 illustrates an event announcing system according to the first embodiment of the invention.

The first embodiment of the invention is an event announcing system. Please refer to FIG. 1. FIG. 1 illustrates an event announcing system. As shown in FIG. 1, the event announcing system 1 comprises a first portable electrical apparatus 11, a second electrical portable 12, a third portable electrical apparatus 13, a first server 14, a second server 15, and network 16. The first portable electrical apparatus 11, the second electrical portable 12, and the third portable electrical apparatus 13 can communicate with the first server 14 to transmit information with each other via the network 16. The first server 14 and the second server 15 can transmit, but not limited to, information with each other by the way of wireless/wire communication. Furthermore, the first server 14 can be even embedded in the second server 15.

In fact, the number of the portable electrical apparatus in the event announcing system 1 is arbitrary and not limited to three. Additionally, the first portable electrical apparatus 11, the second portable electrical apparatus 12, and the third portable electrical apparatus 13 may be a cell phone, a smart mobile phone, a PDA, or other portable electrical apparatuses capable of transmitting information. The network 16 could be a wireless network, for example, 2G, 3G, 3.5G, 4G, WiMax wireless network, or other types of wireless network. In other words, the first portable electrical apparatus 11, the second portable electrical apparatus 12, and the third portable electrical apparatus 13 can transmit information to the first server 14 by wireless communication.

Next, each part of the event announcing system 1 and its function will be detailed introduced respectively.

Figure 2:
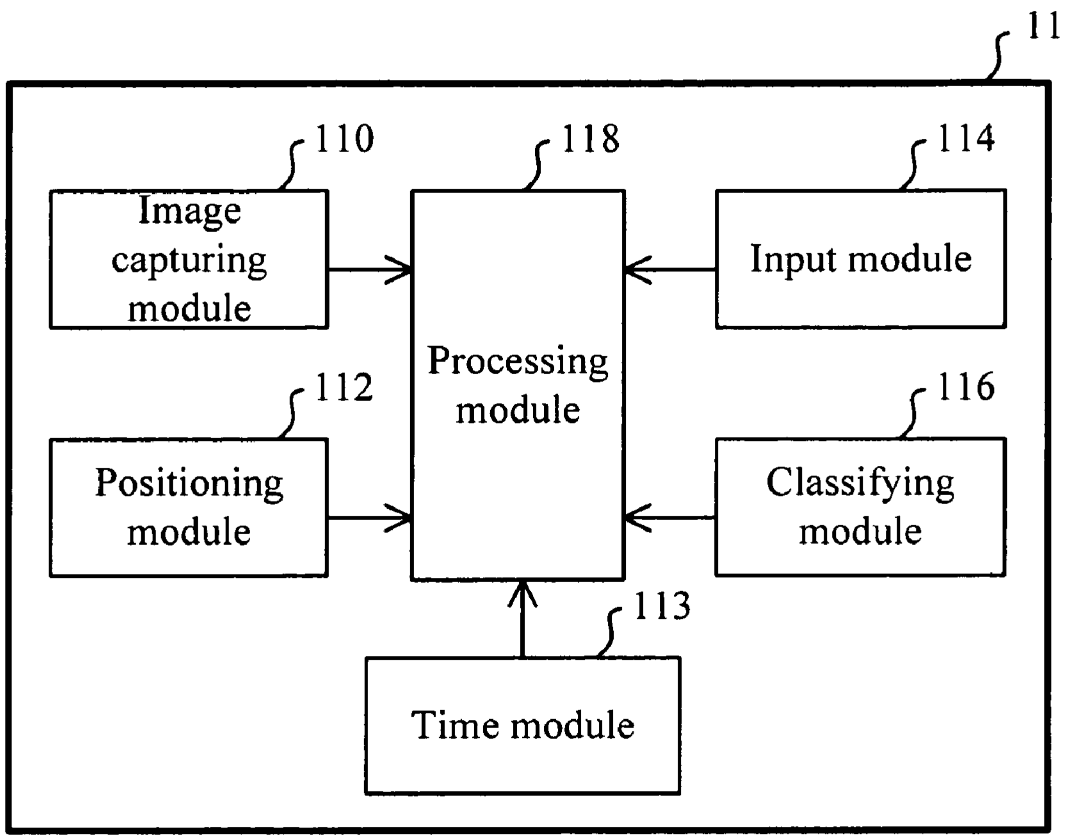
FIG. 2 illustrates a function block diagram of the first portable electrical apparatus shown in FIG. 1.

First of all, the first portable electrical apparatus 11 will be introduced. Please refer to FIG. 2. FIG. 2 illustrates a function block diagram of the first portable electrical apparatus 11. As shown in FIG. 2, the first portable electrical apparatus 11 comprises an image capturing module 110, a positioning module 112, a time module 113, an input module 114, a classifying module 116, and a processing module 118. The image capturing 110, the positioning module 112, the time module 113, the input module 114, and the classifying module 116 are coupled to the processing module 118 respectively.

In one embodiment, the image capturing module 110 of the first portable electrical apparatus 11 is used for capturing an image information related to an event. In fact, the image capturing module 110 comprises a camera or a video camera and the image information comprises a picture or a film. For example, when a user drives across some crossroads, he witnesses a broken traffic signal. At the same time, the user takes a picture of the broken traffic signal. Additionally, the image capturing module 110 comprises an image code unit (not shown in the figure) for coding images captured by the camera or the video camera.

When the image capturing module 110 captures the image information related to the event, the positioning module 112 receives a positioning information related to the first portable electrical apparatus 11. In fact, the positioning module 112 receives the positioning information from a positioning system. Besides, the positioning information can comprise, but not limited to, the information about the position of the portable electrical apparatus 11. The positioning system could be a global positioning system (GPS), an assisted global positioning system (AGPS), a global navigation satellite system (GLONASS), or a Galileo satellite navigation positioning system.

Additionally, when the image capturing module 110 captures the image information related to the event, the time module 113 receives the time information about the timing of capturing the image information by the image capturing module 110. In fact, the time module 113 could receive, but not limited to, the time information from the positioning system.

For example, it is assumed that the announcer witnesses a lot of garbage at roadside and wants to report this event. When the announcer takes a picture of the garbage at roadside, the positioning module and the time module of the cell phone will receive, but not limited to, a position information (e.g., 48°52'10" N, 12°19'59" E) of the cell phone from the positioning system and the time information (e.g., 2008/10/12 10:25:38 AM) about the exact time of taking the picture.

In practical applications, since the announcer and his cell phone are not far from the scene of the event, the positioning information received from the positioning system by the positioning module of the cell phone can be regarded as the position of the scene of the event.

In one embodiment, the input module 114 of the first portable electrical apparatus 11 is used for the announcer to input the event information related to the event. In fact, the input module 114 comprises a microphone, a keyboard, or a penpower (not shown in the figures). By doing so, the even information is shown in a form of text or sound. In other words, the announcer can input the event information in the form of text/sound as a commentary of the image information of the event.

As aforementioned instance, after the announcer takes the picture of the garbage at roadside, the announcer can record, type, or write "there is a lot of garbage at roadside without cleaning" via the microphone, the keyboard or the inputting pad for a commentary of the picture. Additionally, if the announcer is far away from the position of the event, the announcer can also describe the direction and the distance between the cell and the position of the event in a form of text or sound, for example, the garbage is 30 meters away from the announcer's cell phone in the west. It is useful for the following judgment.

In the embodiment, the classifying module 116 of the first portable electrical apparatus 11 is used for generating a classifying information related to the event. In fact, the classifying module 116 can show the classifying list on the screen of the first portable electrical apparatus 11 for the announcer to select the classifying information related to the event according to the type of the event. As the above-mentioned instance, the announcer selects the item of "environment pollution" from the classifying list shown on the screen of the cell phone as the classifying information of the garbage stacked event.

Subsequently, the processing module 118 of the first portable electrical apparatus 11 will be introduced. In this embodiment, when the processing module 118 receives the image information, the positioning information, the time information, the event information, and the classifying information from the image capturing module 110, the positioning module 112, the time module 113, the input module 114, and the classifying module 116 respectively, the processing module 118 will integrate the image information, the positioning information, the time information, the event information, and the classifying information related to the event to generate an announcing signal. In other words, the announcing signal comprises the image information, the positioning information, the time information, the event information, and the classifying information related to the event.

Additionally, the processing module 118 further comprises a wireless network linking unit (not shown in the figures) for linking with the network 16 and transmitting the announcing signal to the first server 14 via the network 16.

Figure 3:
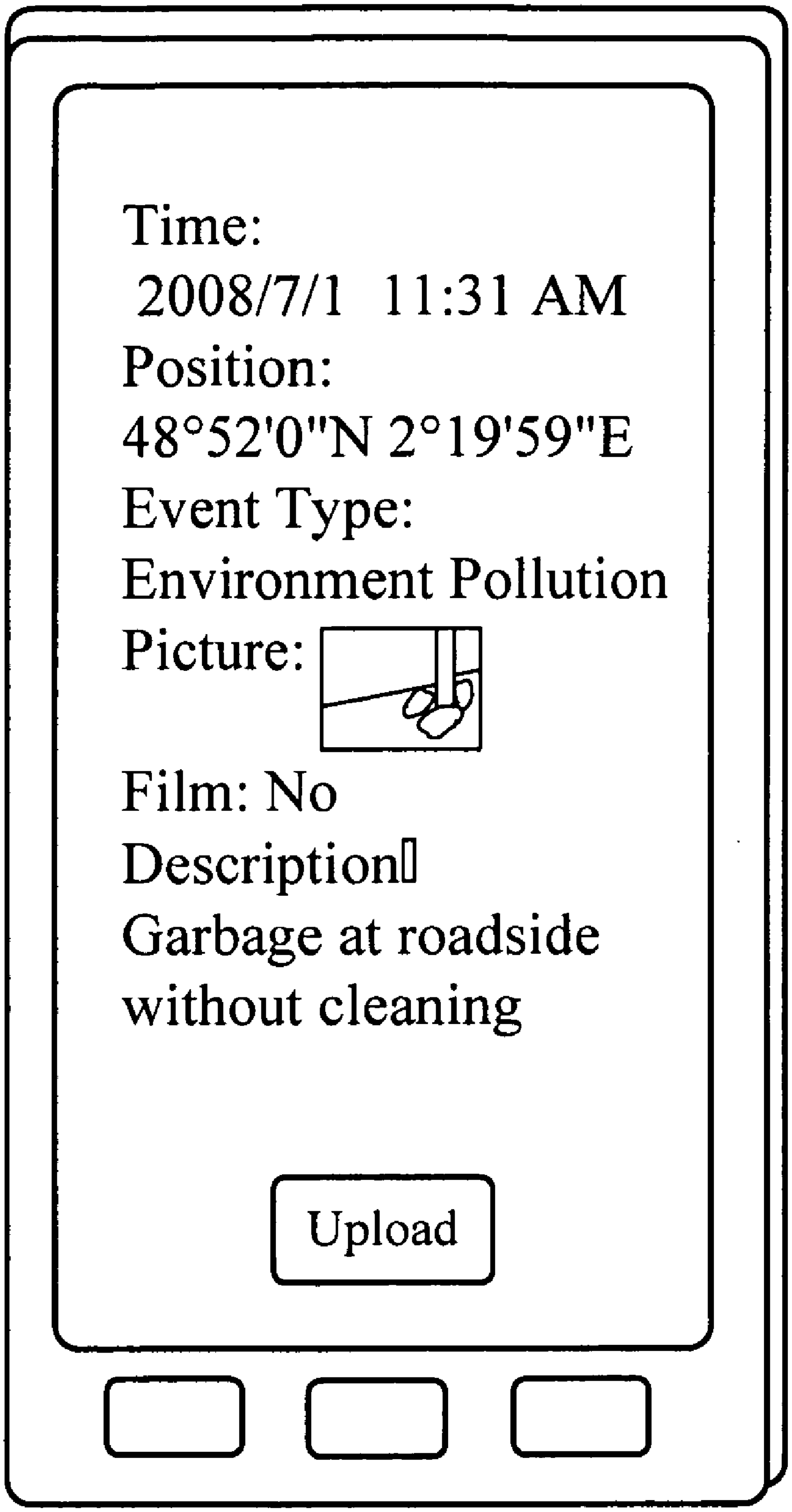
FIG. 3 illustrates one example of an announcing signal shown on a screen of a cell phone.

Please refer to FIG. 3. FIG. 3 illustrates one example of an announcing signal shown on a screen of a cell phone. After the announcer finishes the procedure of taking the picture, inputting the event information, and selecting the type of the event, the processing module of the cell phone will integrate the image information, the positioning information, the time information, the event information, and the classifying information related to the event to generate an announcing signal displayed on the screen of the cell phone, as shown in FIG. 3. After all information confirmed by the announcer is correct and the user presses the upload button, the wireless network linking unit of the processing module of the cell phone will transmit the announcing signal via the network. Of course, if the announcer found the information is not correct, for example, the type of the event is selected incorrectly, the announcer will operate the cell phone to modify for assuring the correctness of the information.

The condition of operating the first portable electrical apparatus 11 is similar to the condition of operating the second portable electrical apparatus 12 and the third portable electrical apparatus 13 and will not be described here again. Subsequently, the first server 14 of the event announcing system 1 will be introduced. In fact, the first server 14 is regarded as an announcing information integration platform. In other words, the first server 14 can receive announcing signals from different portable electrical apparatuses and the announcing signals are processed to be a useful event report.

Figure 4:
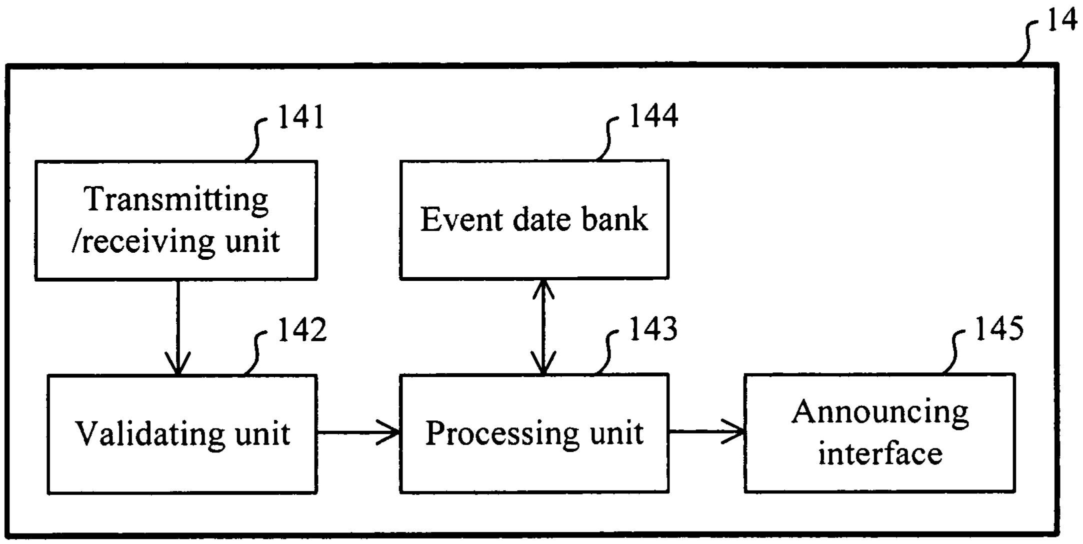
FIG. 4 illustrates a function block diagram of the first server shown in FIG. 1.

Please refer to FIG. 4. FIG. 4 illustrates a function block diagram of the first server 14. As shown in FIG. 4, the first server 14 comprises a transmitting/receiving unit 141, a validating unit 142, a processing unit 143, an event data bank 144, and an announcing interface 145. The validating unit 142 is coupled to the transmitting/receiving unit 141 and the processing unit 143; the processing unit 143 is coupled to the event date bank 144 and the announcing interface 145. Next, each unit of the first server 14 and the function of each unit will be introduced.

In the embodiment, when the first portable electrical apparatus 11 transmits an announcing signal to the first server 14 via the network 16, the transmitting/receiving unit 141 of the first server 14 will receive the announcing signal and transmit a reply information to the first portable electrical apparatus 11 via the network 16 for informing the announcer that announcing signal has been received and processed. Similarly, when the second portable electrical apparatus 12 or the third portable electrical apparatus 13 transmits an announcing signal to the first server 14, the transmitting/receiving unit 141 will receive announcing signals and transmit a reply information to the second portable electrical apparatus 12 or the third portable electrical apparatus 13 via the network 16.

Then, the validating unit 142 of the first server 14 will validate the announcing signal according to a validating rule and thereby judge whether the announcing signal is a prank or not to prevent the wasting of society cost. In practical applications, the validating rule is not confined and it is designed according to user's requirements. For example, by the validating rule, the identification of the announcer is set as different degrees of reliance index (identifying the identification of the announcer via the identifying code of the cell phone) and a threshold limit value of the reliance index is set, too. If the announcer is a police or a firefighter, the reliance index is high; if the announcer is a deceiver, the reliance index is relatively low.

If the reliance index of an announcer is higher than the threshold value of the reliance index, the validating unit 142 will determine that the announcing signal passes the validation. On the contrary, if the reliance index of another announcer is smaller than the threshold value of the reliance index, the validating unit 142 will determine that the announcing signal does not pass the validation. However, in order to prevent that the validating unit 142 makes mistakes, the validating person should check it again according to the content of the announcing signal.

If the announcing signal has already passed the validation of the validating unit 142, then the processing unit 143 will process all of the information of the announcing signal instantaneously and compare them with the prior event information stored in an event date bank 144. In fact, the operator of the first server 14 can validate the announcing signal quickly and correctly via the processing unit 143, so whether the information announced by the announcer is correct or not can be determined. Then, an event report is generated according to the information and shown or published by the authorities.

Additionally, the processing unit 143 further analyzes and compiles the statistics about distribution and frequency of different types of events. By doing so, the processing unit 143 will generate a meaningful analyzed result for future administering reference. For example, if there are holes on a road, it means that the quality of the road may be poor; if an area is always flooded after raining, it means that the drainage system of the area needs to be improved.

Subsequently, the announcing interface 145 of the first server 14 transmits the processed event report to one or more second server 15 according to the type and position of the report. In practical applications, the second server 15 is an authority server, a public server, or a private server. The relationship between the event type or the position of the event and the second server 15 is designed by the first server 14 or the operator according to practical requirements.

For example, if the event report is classified as "environment pollution" and happened in Taipei city, the announcing interface 145 will publish the event report to the second server 15 of Department of Environmental Protection in Taipei City Government and the second server 15 of Environmental Protection Administration Executive Yuan so that the related authorities can process and trace the event.

Figure 5:
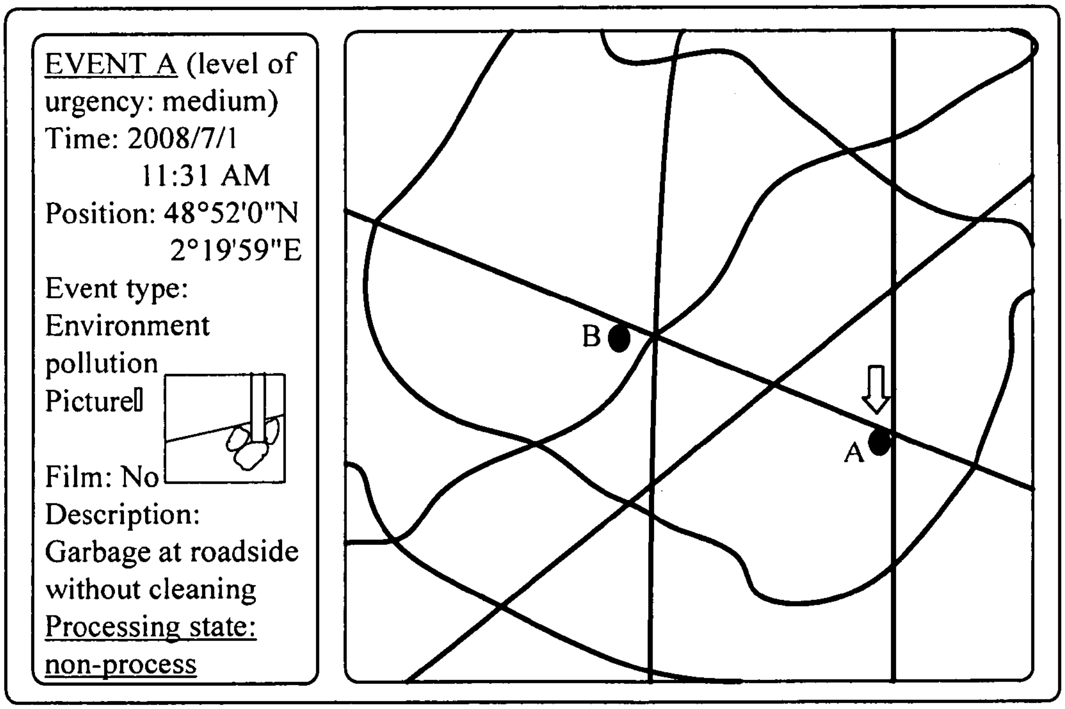
FIG. 5 illustrates one example of an operating image shown on a screen of the second server.

As the above-mentioned instance, if the second server 15 of Department of Environmental Protection of Taipei City Government receives the event report, the second serve 15 will show or publish the event report. For example, the symbol of the event and all of the information corresponding to the event will be shown in the operating image on the screen of the second server. Please refer to FIG. 5. FIG. 5 illustrates one example of the operating image shown on a screen of the second server. As shown in FIG. 5, the position of an event A is shown on the right side of the operating image. When the operator operates a cursor to point at the position of the event A, all of the event reports corresponding to the event A will be shown on the left side of the operating image for reference.

In practical applications, the second server 15 can also show or publish the event report and the processing history of the event on a bulletin board system or a web page so that the public can get the event report and the processing history of the event. In this way, an ordinary person can know all of the events happened in his/her surroundings. In fact, the second server 15 can show or publish the event report in other forms; it is not limited to the above mentioned form.

Additionally, the operator can also determine the sequence of events according to the level of emergency. For instance, as shown in FIG. 5, the event A is an event of medium emergency level and the event B is an event of high emergency level. It means that the event B is more emergent than the event A. Accordingly, the commander can send proper amount of resources and persons to the scene of the event according the processing sequence of the events.

After the event A is finished, the operator will change the state of the event A as "processed". Then, the second server 15 will transmit the processed signal to the first server 14. Subsequently, the first server 14 will transmit the processed signal to the first portable electrical apparatus 11 via the network 16 for informing the announcer that the event has been well processed.

Figure 6:
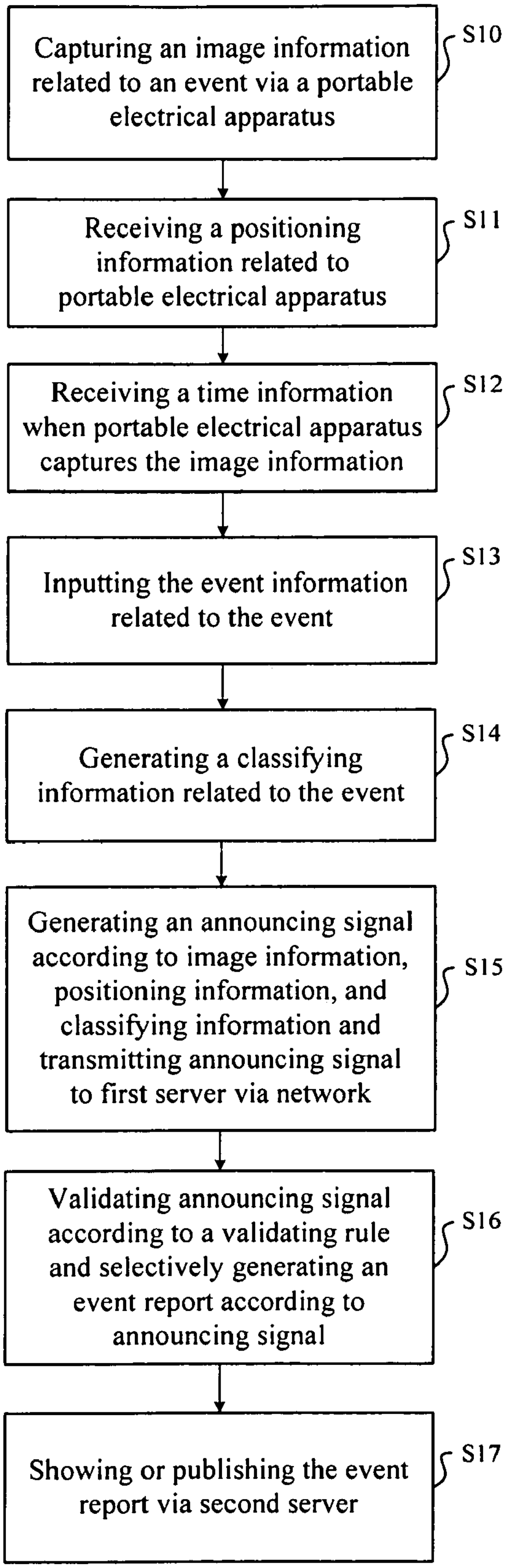
FIG. 6 illustrates a flow chart of a method of operating an event announcing system according to the second embodiment of the invention.

The second embodiment of the invention is a method of operating an event announcing system. As implied by the name, the method is used for operating an event announcing system. In this embodiment, the event announcing system comprises a portable electrical apparatus, a network, a first server, and a second server. Please refer to FIG. 6. FIG. 6 illustrates a flow chart of a method of operating an event announcing system.

Please refer to FIG. 6. First of all, step S10 is performed to capture an image information related to an event via the portable electrical apparatus. When the portable electrical apparatus captures the image information, step S11 is performed to receive a positioning information via the portable electrical apparatus. In fact, the portable electrical apparatus can receive the positioning information from a positioning system. The positioning system can be a global poisoning system, an assisted global positioning system, a global navigation satellite system, or a Galileo satellite navigation positioning system. Additionally, the positioning information can also comprise, but not limited to, the location information of the portable electrical apparatus.

When the portable electrical apparatus captures the image information, step S12 is performed to receive a time information. In fact, the portable electrical apparatus receives, but not limited to, the time information from the positioning system. Additionally, the sequence of step S11 and step S12 is not confined. In other words, step S11 can be perform before/after step S12 is performed, or step S11 and step S12 can be performed at the same time.

Afterward, step S13 and step S14 are performed to input an event information and to generate a classifying information related to the event via the portable electrical apparatus. In fact, the event information is shown in a form of text or sound. Additionally, the sequence of step S13 and step S14 is not confined. In other words, step S13 can be perform before/after step S14 is performed, or step S13 and step S14 can be performed at the same time.

Subsequently, step S15 is performed to generate an announcing signal according to the image information, the positioning information, the time information, the event information, and the classifying information, and then to transmit the announcing signal to the first server via the network. In fact, the first server can be an announcing information integration platform. When the first server receives the announcing signal, step S16 is performed to validate the announcing signal according to a validating rule and selectively to generate an event report to the second server according to the announcing signal. In fact, the second server can be an authority server, a public server, or a private server.

Finally, step S17 is performed to show or publish an event report. For example, the second server shows, but not limited to, the event report on an operating image of its screen. Additionally, when the first server receives a reply information from the second server, the first server will transmit the reply information to the portable electrical apparatus via the network.

Compared with the prior art, the event announcing system and operating method thereof fully take advantages of satellite positioning technology and mobile communication technology. When an ordinary person witnesses or suffers from an instantaneous event (for example, an urgent event, an illegal event, or a traffic accident), he/she can operate his/her own portable cell phone to report the related information to the authorities. It is useful for the authorities to show or publish the instantaneous event report and deal with the event as soon as possible.

In addition to the above-mentioned mutual attention function, the government can analyze and compile the statistic distribution and frequency of different kinds of events for future administering reference via the event announcing system. By doing so, the event announcing system can improve the processing efficiency of the instantaneous event and lower the society cost largely, so as to build a healthier and safer environment.

Although the present invention has been illustrated and described with reference to the preferred embodiment thereof, it should be understood that it is in no way limited to the details of such embodiment but is capable of numerous modifications within the scope of the appended claims.

What is claimed is:

1. An event announcing system, comprising:
a portable electrical apparatus, comprising:
an image capturing module for capturing an image information related to an event;
a positioning module, when the image capturing module captures the image information, the positioning module receiving a positioning information;
a time module, when the image capturing module captures the image information, the time module receiving a time information;
a classifying module for generating a classifying information related to the event; and
a processing module, coupled to the image capturing module, the positioning module, the classifying module and the time module, for generating an announcing signal including an identifying code corresponding to the portable electrical apparatus, the image information, the positioning information, the classifying information and the time information;
a network; and
a first server for validating the announcing signal according to a validating rule as the first server receives the announcing signal via the network, the first server generating an event report corresponding to the announcing signal as a reliance index decided by the identifying code passes a threshold value set by an operator of the event announcing system.

2. The event announcing system of claim 1, wherein the portable electrical apparatus further comprises:
an input module, coupled to the processing module, for inputting an event information related to the event and transmitting the event information to the processing module further adding the event information into the announcing signal.

3. The event announcing system of claim 2, wherein the event information is in a form of text or sound.

4. The event announcing system of claim 1, further comprising:

a second server, when the second server receives the event report from the first server, the second server showing or publishing the event report.

5. The event announcing system of claim 4, wherein the second server is an authority server, a public server, or a private server.

6. The event announcing system of claim 4, wherein when the first server receives a reply information from the second server, the first server transmitting the reply information to the portable electrical apparatus via the network.

7. The event announcing system of claim 1, wherein the positioning module receives the positioning information from a positioning system.

8. The event announcing system of claim 7, wherein the positioning system is selected from one of a group consisting of a global positioning system (GPS), an assisted global positioning system (AGPS), a global navigation satellite system (GLONASS), and a Galileo satellite navigation positioning system.

9. The event announcing system of claim 1, wherein the positioning information comprises a position information of the portable electrical apparatus.

10. A method of operating an event announcing system, the event announcing system comprising a portable electrical apparatus, a network, and a first server, the method comprising the steps of:

(a) capturing an image information related to an event via the portable electrical apparatus;

(b) receiving a positioning information via the portable electrical apparatus as the portable electrical apparatus captures the image information;

(c) receiving a time information via the portable electrical apparatus as the portable electrical apparatus captures the image information;

(d) generating a classifying information related to the event;

(e) generating an announcing signal including an identifying code corresponding to the portable electrical apparatus, the image information, the positioning information, the classifying information and the time information, and transmitting the announcing signal to the first server via the network; and (f) validating the announcing signal by the first server according to a validating rule, and generating an event report as a reliance index decided by the identifying code passes a threshold value set by an operator of the event announcing system.

11. The method of claim 10, further comprising the step of:

(g) inputting an event information related to the event via the portable electrical apparatus, and adding the event information into the announcing signal.

12. The method of claim 11, wherein the event information is in a form of text or sound.

13. The method of claim 10, wherein the event announcing system further comprises a second server, and further comprising the step of:

(h) when the second server receives the event report from the first server, showing or publishing the event report via the second server.

14. The method of claim 13, wherein the second server is an authority server, a public server, or a private server.

15. The method of claim 13, wherein the first server receives a reply information from the second server, the first server transmitting the reply information to the portable electrical apparatus via the network.

16. The method of claim 10, wherein the portable electrical apparatus receives the positioning information from a positioning system.

17. The method of claim 16, wherein the positioning system is selected from one of a group consisting of a global positioning system, a assisted global positioning system, a global navigation satellite system, and a Galileo satellite navigation positioning system.

18. The method of claim 10, wherein the positioning information comprises a position information of the portable electrical apparatus.

* * * * *